US006865891B2

(12) United States Patent
Walsh et al.

(10) Patent No.: US 6,865,891 B2
(45) Date of Patent: Mar. 15, 2005

(54) GAS TURBINE ENGINE

(75) Inventors: Philip P. Walsh, Solihull (GB); Paul Fletcher, Rugby (GB)

(73) Assignee: Rolls-Royce plc, London (GB)

( * ) Notice: Subject to any disclaimer, the term of this patent is extended or adjusted under 35 U.S.C. 154(b) by 130 days.

(21) Appl. No.: 10/431,400

(22) Filed: May 8, 2003

(65) Prior Publication Data

US 2004/0006994 A1 Jan. 15, 2004

(30) Foreign Application Priority Data

May 16, 2002 (GB) .............................................. 0211348
May 16, 2002 (GB) .............................................. 0211349

(51) Int. Cl.[7] .............................. F02C 3/04; F02C 7/36
(52) U.S. Cl. .......................... 60/792; 60/39.25; 60/726
(58) Field of Search .......................... 60/39.15, 39.163, 60/39.17, 39.25, 269, 726, 791, 792

(56) References Cited

U.S. PATENT DOCUMENTS

| | | | | |
|---|---|---|---|---|
| 3,548,597 A | * | 12/1970 | Etessam | 60/269 |
| 3,585,795 A | * | 6/1971 | Grieb | 60/39.163 |
| 3,899,886 A | * | 8/1975 | Swick | 60/39.25 |
| 4,160,362 A | | 7/1979 | Martens et al. | |
| 4,803,837 A | | 2/1989 | Simmons | |
| 6,332,313 B1 | * | 12/2001 | Willis et al. | 60/776 |
| 2001/0020360 A1 | | 9/2001 | Tsukamoto | |
| 2001/0039794 A1 | | 11/2001 | Rocklin | |

FOREIGN PATENT DOCUMENTS

| | | |
|---|---|---|
| EP | 0770771 A | 10/1996 |
| GB | 2280223 A | 1/1995 |
| GB | 2301402 A | 4/1996 |
| JP | 103080 A | 4/1998 |
| WO | WO 05904 A | 3/1994 |

* cited by examiner

Primary Examiner—Louis J. Casaregola
(74) Attorney, Agent, or Firm—W. Warren Taltavull; Manelli Denison & Selter PLLC (57) ABSTRACT

A gas turbine engine (10) comprises a first compressor (16), a combustor (22) and a first turbine (24) arranged in flow series. The first turbine (24) is arranged to drive the first compressor (16). The first compressor (16) has variable inlet guide vanes (38) and the first turbine (24) has variable inlet guide vanes (42). A second compressor (48) is arranged upstream of the first compressor (16). An auxiliary intake (12) is arranged upstream of the first compressor (16) and downstream of the second compressor (48). A valve (54) is arranged upstream of the first compressor (16) and downstream of the second compressor (48). The valve (54) is movable between a first position in which the second compressor (48) supplies air to the first compressor (16) and a second position in which the second compressor (48) does not supply fluid to the second compressor (16) and the auxiliary intake (12) supplies fluid to the first compressor (16). A drive means (60,62,64,66) is arranged to selectively drive the second compressor (48).

7 Claims, 6 Drawing Sheets

GAS TURBINE ENGINE

The present invention relates to a gas turbine engine and in particular to gas turbine engines for non-aero applications, although it may be applicable to gas turbine engine for aero applications.

One main consideration for the operation of gas turbine engines is the specific fuel consumption value (SFC), measured in kg/kWhrs. In general for certain gas turbine engine applications especially marine, automotive, aero and even industrial, a significant proportion of operation is at low power. A gas turbine engine utilises hot working fluid expanding through a given expansion ratio in the turbines which produces a power in excess of that required for the compressor to produce the corresponding pressure ratio. This is due to pressure and temperature ratios being proportional to one another during compression or expansion in the simple gas turbine engine cycle, which means that temperature change and hence work, is proportional to the initial temperature level Therefore reducing the amount of fuel available at part power results in reduced temperature levels and hence a reduced speed and pressure ratio thus resulting in a significant increase in specific fuel consumption (SFC.

Recuperated gas turbine engines use heat exchangers to return heat from the final turbine exhaust to pre-heat compressed air entering the combustor. This helps to conserve fuel by raising the combustor air temperature and therefore limiting the amount of fuel needed to achieve the turbine inlet temperature.

Our published International patent application WO9936688A discloses a small gas turbine engine comprising a centrifugal compressor, a diffuser, a heat exchanger, a combustor and at least one turbine. The compressor has variable inlet guide vanes, the diffuser has variable outlet guide vanes and the at least one turbine has variable inlet guide vanes so that the flow capacity of each component is independently variable while maintaining the temperature, pressure ratio and speed of rotation of the gas turbine engine substantially constant.

Our published European patent application EP1055809A2 discloses a small gas turbine engine comprising a centrifugal compressor, a diffuser, a heat exchanger, a combustor and at least one turbine. The compressor has variable inlet guide vanes, the diffuser has variable outlet guide vanes, the combustor has a variable area inlet and the at least one turbine has variable inlet guide vanes so that the flow capacity of each component is independently variable while maintaining the temperature, pressure ratio and speed of rotation of the gas turbine engine substantially constant.

An effective way of ensuring low fuel consumption at any specified part power level is to use a smaller gas turbine engine in terms of airflow and power. However, the maximum power required from the gas turbine engine is fixed and hence the gas turbine engine cannot be made smaller in terms of air flow and power.

Accordingly the present invention seeks to provide a novel gas turbine engine which reduces, preferably overcomes, the above mentioned problems.

Accordingly the present invention provides a gas turbine engine comprising a first compressor, a combustor and a first turbine arranged in flow series, the first turbine being arranged to drive the first compressor, the first compressor having variable inlet guide vanes, the first turbine having variable inlet guide vanes, a second compressor being arranged upstream of the first compressor, an auxiliary intake being arranged upstream of the first compressor and downstream of the second compressor, valve means being arranged upstream of the first compressor and downstream of the second compressor, the valve means being movable between a first position in which the second compressor supplies fluid to the first compressor and a second position in which the second compressor does not supply fluid to the second compressor and the auxiliary intake supplies fluid to the first compressor and selective drive means being arranged to selectively drive the second compressor.

Preferably a second turbine is arranged downstream of the first turbine, the second turbine having variable inlet guide vanes.

Preferably the second turbine is arranged to drive an output shaft. Preferably the second turbine is arranged to drive the output shaft via a gearbox. Preferably the second turbine is arranged to drive the second compressor via the gearbox. Preferably the second turbine is arranged to drive the second compressor via a second gearbox.

Alternatively the first turbine is arranged to drive an output shaft. The first turbine may be arranged to drive the output shaft via a gearbox. The first turbine may be arranged to drive the second compressor via a second gearbox.

Preferably the selective drive means comprises a clutch. Alternatively the output shaft may be arranged to drive an electrical generator.

Alternatively the selective drive means comprises the electrical generator driven by the second turbine and an electrical motor arranged to drive the second compressor.

Preferably the valve means comprises at least one pivotally mounted flap valve. Preferably the valve means comprises a plurality of flap valves.

Preferably there are means to selectively move the valve means between the first and second positions.

Preferably a recuperator is arranged between the first compressor and the combustor.

Preferably the first compressor is a centrifugal flow compressor. Preferably the second compressor is a centrifugal flow compressor.

Preferably the first turbine is a radial flow turbine. Preferably the second turbine is an axial flow turbine.

Preferably a diffuser is arranged between the first compressor and the combustor, the diffuser having variable area guide vanes.

Preferably there are means to inject cooling liquid into the gas turbine engine, the means to inject cooling liquid being arranged to inject cooling liquid upstream of the first compressor, within the first compressor, between the first compressor and the heat exchanger, within the heat exchanger, between the combustor and the first turbine, within the first turbine or between the first turbine and the heat exchanger.

The means to inject cooling liquid may be arranged to is inject cooling liquid between the combustor and the first turbine, within the first turbine or between the first turbine and the heat exchanger.

The means to inject cooling liquid may be arranged to inject cooling liquid between the first turbine and the second turbine. The means to inject cooling liquid may be arranged to inject cooling liquid between the combustor and the first turbine, within the first turbine, between the first turbine and the second turbine, within the second turbine or between the second turbine and the heat exchanger.

The present invention will be more fully described by way of example with reference to the accompanying drawings in which.

A gas turbine engine according to the present invention is particularly suitable for marine and automotive applications, which operate largely at low power. For example an automotive gas turbine engine may utilise 6% of the available power at speeds of approximately 30 mph (48 km/h), 18% of the available power at speeds of approximately 56 mph (90 km/h), 35% of the available power at speeds of approximately 75 mph (120 km/h) for a vehicle with a maximum speed of 115 mph (185 km/h).

Figure 1:
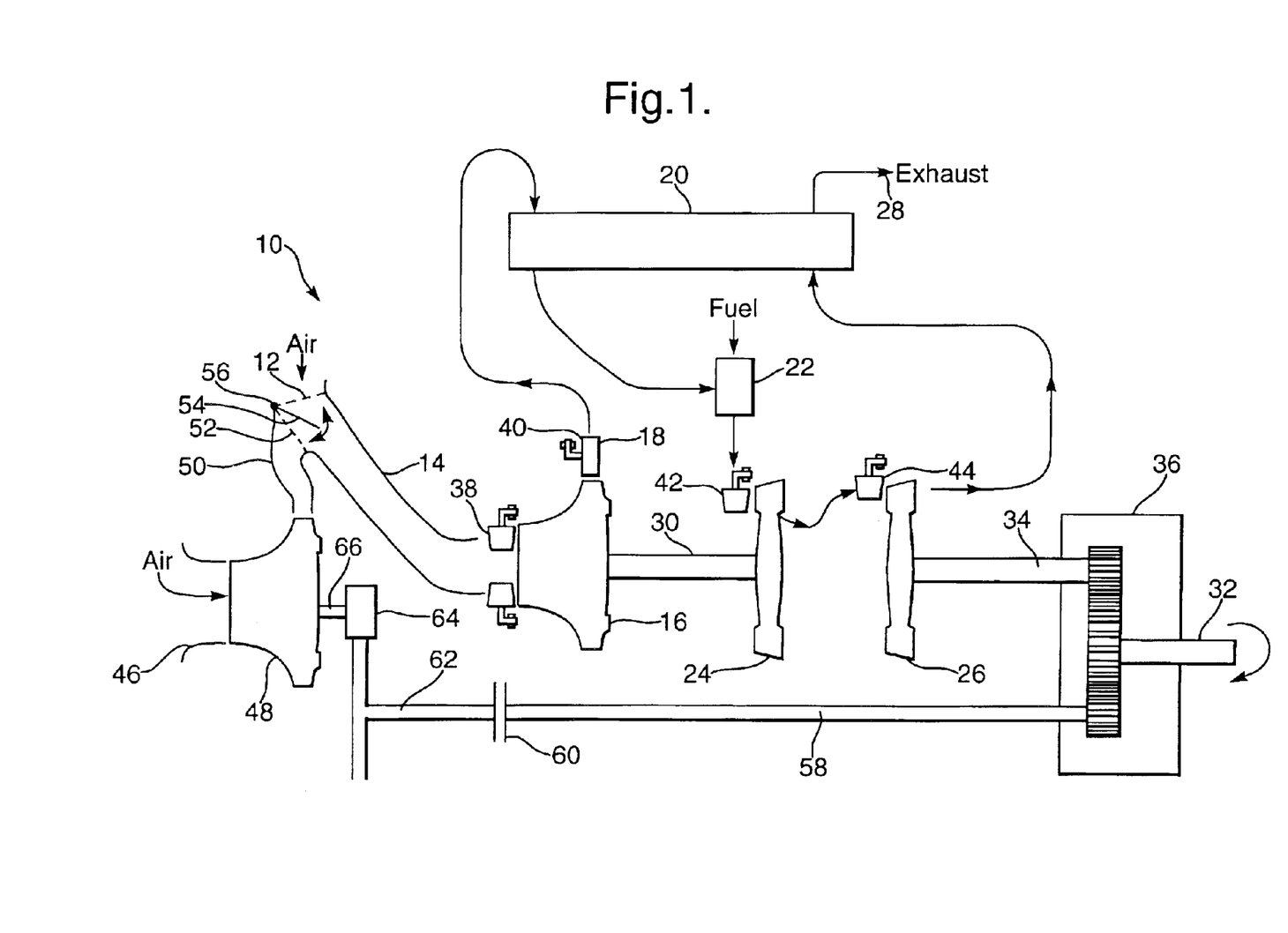
FIG. 1 is a schematic diagram of a gas turbine engine according to the present invention.

The gas turbine engine 10 according to the present invention, as shown in FIG. 1, comprises in flow series an inlet 12, an inlet duct 14, a first centrifugal flow air compressor 16, a diffuser 18, a heat exchanger 20, a combustor 22, a first radial flow turbine 24, a second axial flow turbine 26, the heat exchanger 20 and an exhaust 28. The first turbine 24 is arranged to drive the first compressor 16 via a shaft 30. The second turbine 26 is arranged to drive an output shaft via a shaft 34 and a first gearbox 36. The output shaft 32 is coupled to any suitable load device (not shown), for example, the driving wheels of a motor vehicle or a propeller of a marine vessel or an electric generator.

The inlet duct 14 includes a stage of variable inlet guide vanes 38 upstream of the first centrifugal flow compressor 16. The diffuser includes a stage of variable guide vanes 40. The first radial flow turbine 24 includes a stage of variable inlet guide vanes 42 upstream of the first turbine 24 and the second axial flow turbine 26 includes a stage of variable inlet guide vanes 44 upstream of the second turbine 26. The combustor 22 is provided with valves (not shown) to vary the flow of air into the combustor 22.

A second centrifugal flow compressor 48 is arranged upstream of the first centrifugal flow compressor 16. The second centrifugal flow compressor 48 has an inlet 46 at its upstream end and an outlet duct 50 at its downstream end. The outlet duct 50 is interconnected with the inlet duct 14 of the first radial flow compressor 16 via an aperture 52. One or more flap valves 54 are pivotally mounted by pivots 56 on the inlet duct 14 and outlet duct 50 such that in a first position the flap valves 54 are movable between a first position and a second position.

In the first position the flap valves 54 open the aperture 52 such that the second centrifugal flow compressor 48 supplies air to the first centrifugal flow compressor 16 and the flap valves 54 close the inlet 12 such that air is not supplied from the inlet 12 to the first centrifugal flow compressor 16.

In the second position the flap valves 54 open the inlet 12 such that the inlet 12 supplies air to the first centrifugal flow compressor 16 and the flap valves 54 close the aperture 52 such that air is not supplied from the second centrifugal flow compressor 48 to the first centrifugal flow compressor 16.

The second axial flow turbine 26 is arranged to drive the second centrifugal flow compressor 48 via the shaft 34 and the gearbox 36. The gearbox 36 also drives a shaft 58, which is clutched to a coaxial shaft 62. The shaft 62 is arranged to drive a second gearbox 64 and the second gearbox 64 is in turn arranged to drive a shaft 66 to which the second centrifugal flow compressor 48 is secured.

In operation of the gas turbine engine 10 at high power levels the clutch 60 transmits drive from the shaft 58 to the shaft 62 such that the second centrifugal flow compressor 48 is driven by the second axial flow turbine 26. The flap valves 54 are moved to the first position such that air is supplied from the second centrifugal flow compressor 48 to the first centrifugal flow compressor 16.

In operation of the gas turbine engine 10 at low power levels the clutch 60 does not transmit drive from the shaft 58 to the shaft 62 such that the second centrifugal flow compressor 48 is not driven by the second axial flow turbine 26. The flap valves 54 are moved to the second position such that air is supplied from the inlet 12 to the first centrifugal flow compressor 16.

The levels of pressure ratio, about 4.5:1, is chosen such that increasing pressure ratio increases specific power. The power increase is due to the increase in both flow and pressure ratio.

The variable guide vanes 38, 40, 42, 44 and valves 54 avoids the operational limitations inherent with a conventional fixed geometry engine. For example, the pressure ratio and hence the power of the core engine, the first compressor 16, combustor 22 and first turbine 24, may be achieved with a smaller increase in combustor 22 temperature if the second axial flow turbine 26 capacity is increased in relation to that of the first radial flow turbine 24.

The power may be increased by significantly increasing the pressure ratio as well as the combustor 22 temperature in order to avoid increasing the inlet temperature of the heat exchanger 20 such that the heat exchanger 20 is not damaged.

The flap valves 54 may be low cost non actuated flap valves 54 such that at low power levels, when the second centrifugal flow compressor 48 inactive, the first centrifugal flow compressor 16 effectively sucks air through the inlet 12 to reduce the pressure loss of sucking through the second centrifugal flow compressor 48 alone. When the second centrifugal flow compressor 48 is active the delivery pressure forces the flap valves 54 to the position to prevent leakage of air through the inlet 12.

The flap valves 54 may be moved by powered actuators (not shown), for example hydraulic, pneumatic, electric or mechanical rams.

It may be possible to use the air drawn into the inlet 46 to drive the second centrifugal flow compressor 48, when the second axial flow turbine 26 is not driving the second centrifugal flow compressor 48, to maintain the second centrifugal flow compressor 48 at a significant rotational speed. This reduces the time lag in engine response that may occur when accelerating the second centrifugal flow compressor 48 from rest and also reduce the wear on the clutch 60 and gearboxes 36 and 64.

The arrangement also enables bleed air to be bled from the duct 14 between the second radial flow compressor 48 and the first radial flow compressor 16 or from the downstream end of the first radial flow compressor 16 of the gas turbine engine 10 at a variety of pressures and power output levels. This is particularly suitable for an aircraft auxiliary power unit gas turbine engine.

Figure 2:
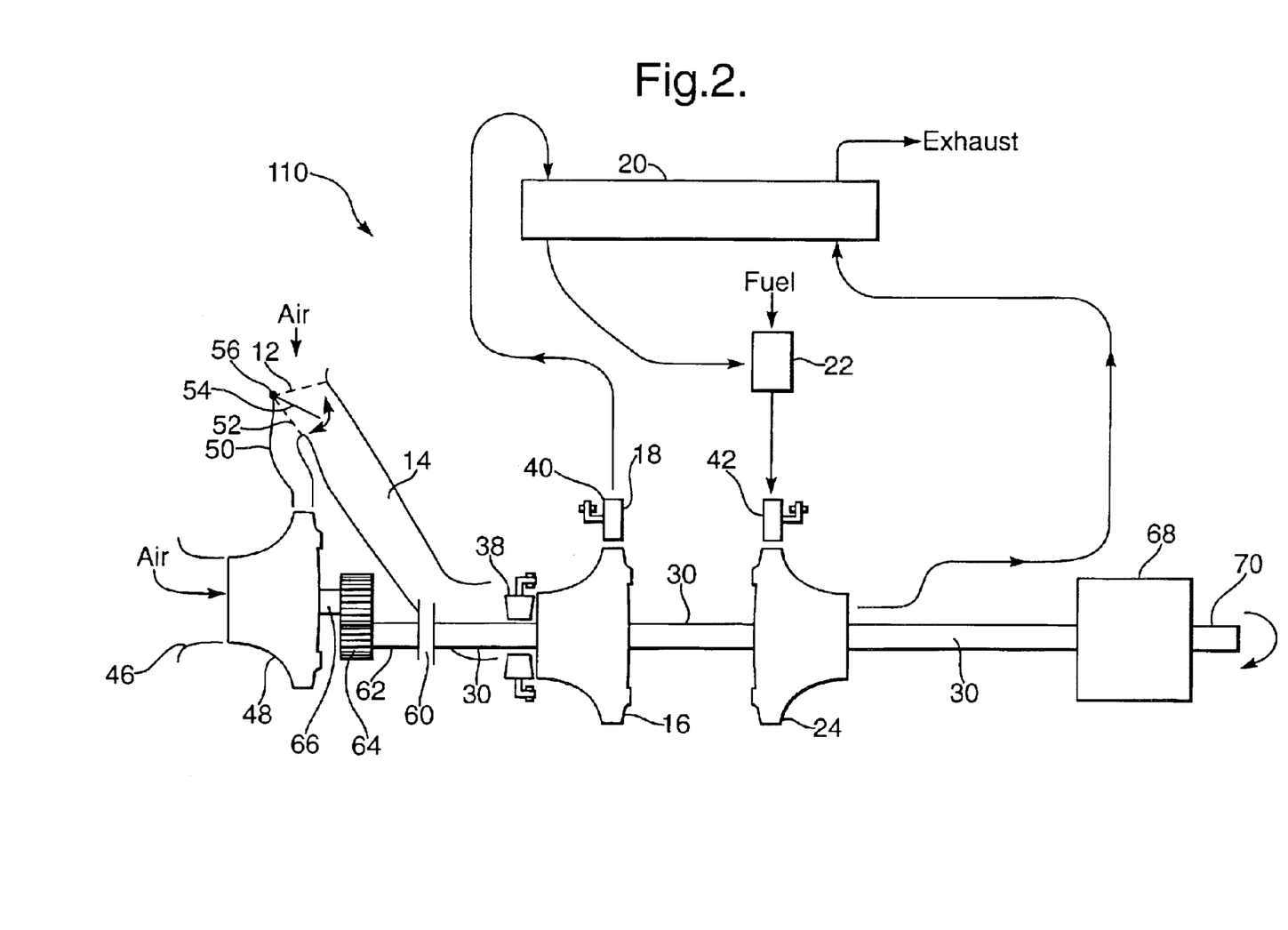
FIG. 2 is a schematic diagram of a gas turbine engine according to the present invention.

A further gas turbine engine 110 according to the present invention is shown in FIG. 2, and like parts are denoted by like numerals. FIG. 2 is similar to FIG. 1 but differs in that there is no second turbine. In this embodiment the first radial flow turbine 24 is arranged to drive an output shaft 70 via the shaft 30 and a continuously variable transmission 68. The first radial flow turbine 24 is arranged to drive the second centrifugal flow compressor 48 via the shaft 30, which is clutched to a coaxial shaft 62. The shaft 62 is arranged to drive a gearbox 64 and the gearbox 64 is in turn arranged to drive a shaft 66 to which the second centrifugal flow compressor 48 is secured.

Figure 3:
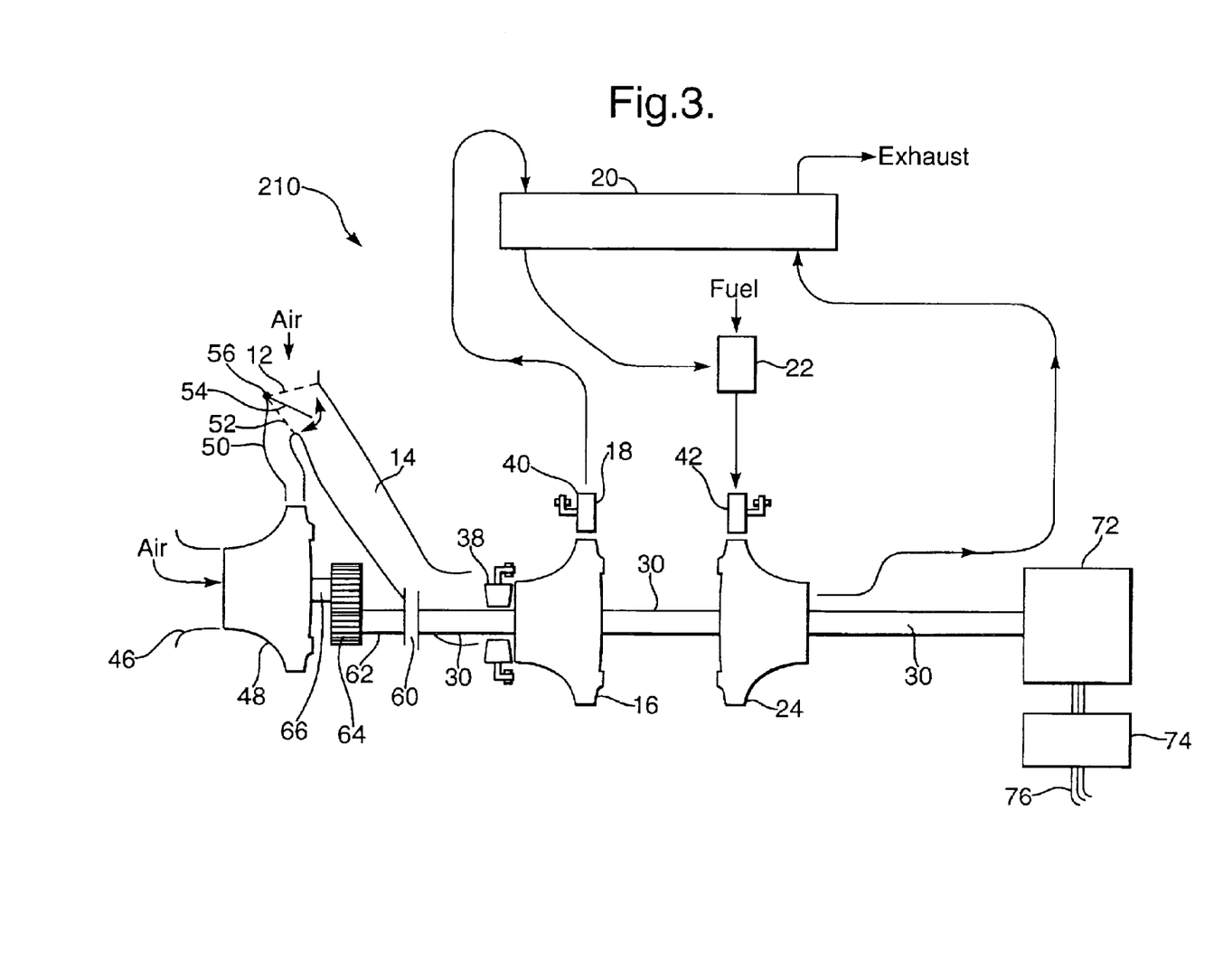
FIG. 3 is a schematic diagram of a gas turbine engine according to the present invention.

Another gas turbine engine 210 according to the present invention is shown in FIG. 3, and like parts are denoted by like numerals. FIG. 3 is similar to FIG. 1 but differs in that there is no second turbine. In this embodiment the first radial flow turbine 24 is arranged to drive an electrical generator 72, for example a high frequency alternator, via the shaft 30. The electrical generator 72 supplies electrical power via power electronics 74 to electrical power leads 76. The first radial flow turbine 24 is arranged to drive the second centrifugal flow compressor 48 via the shaft 30, which is clutched to a coaxial shaft 62. The shaft 62 is arranged to drive a gearbox 64 and the gearbox 64 is in turn arranged to drive a shaft 66 to which the second centrifugal flow compressor 48 is secured.

Figure 4:
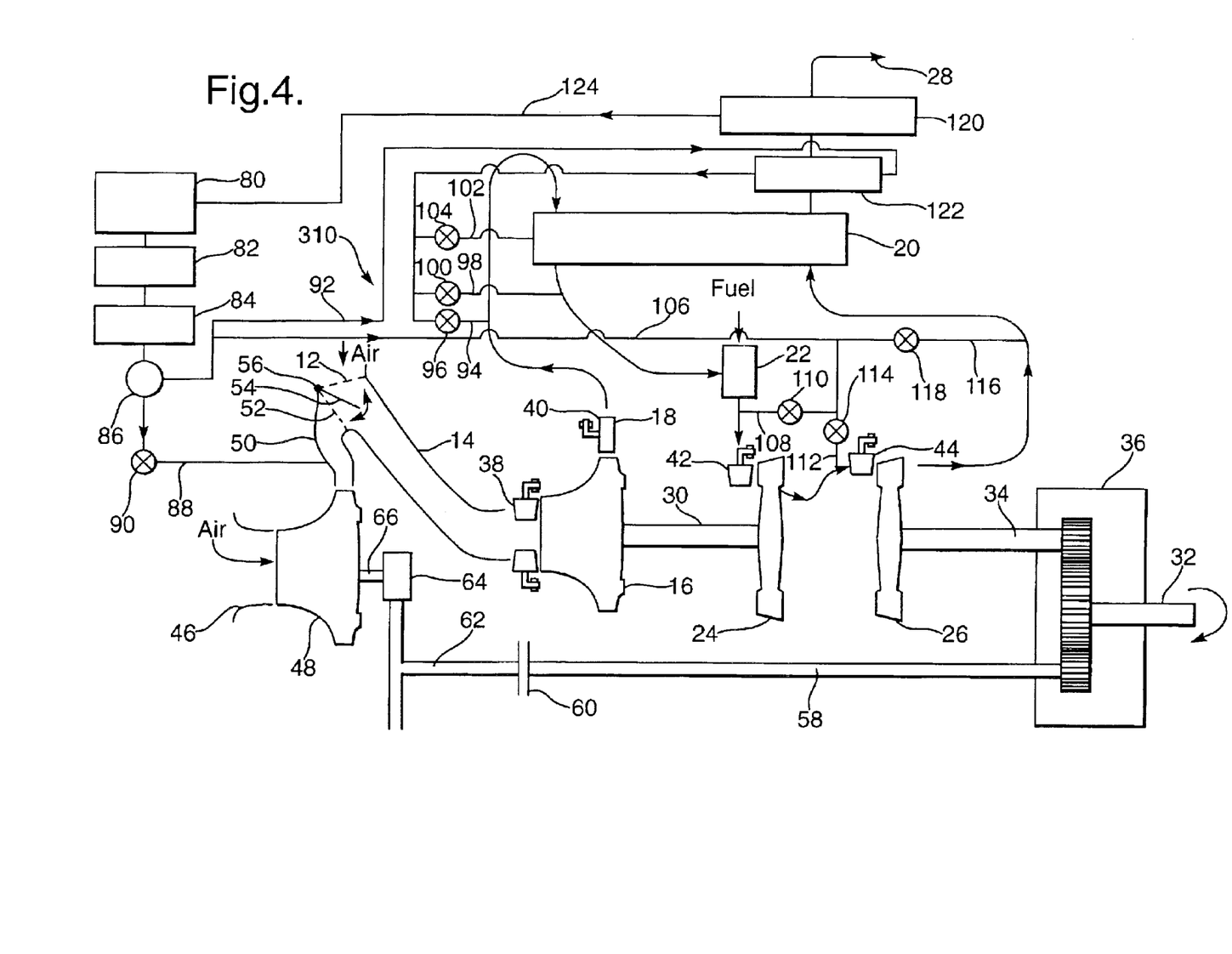
FIG. 4 is a schematic diagram of a gas turbine engine according to the present invention.

A further gas turbine engine 310 according to the present invention, as shown in FIG. 4, comprises in flow series an inlet 12, an inlet duct 14, a first centrifugal flow air compressor 16, a diffuser 18, a heat exchanger 20, a combustor 22, a first radial flow turbine 24, a second axial flow turbine 26, the heat exchanger 20 and an exhaust 28. The first turbine 24 is arranged to drive the first compressor 16 via a shaft 30. The second turbine 26 is arranged to drive an output shaft via a shaft 34 and a first gearbox 36. The output shaft 32 is coupled to any suitable load device (not shown), for example, the driving wheels of a motor vehicle or a propeller of a marine vessel or an electric generator.

The inlet duct 14 includes a stage of variable inlet guide vanes 38 upstream of the first centrifugal flow compressor 16. The diffuser includes a stage of variable guide vanes 40. The first radial flow turbine 24 includes a stage of variable inlet guide vanes 42 upstream of the first turbine 24 and the second axial flow turbine 26 includes a stage of variable inlet guide vanes 44 upstream of the second turbine 26. The combustor 22 is provided with valves (not shown) to vary the flow of air into the combustor 22.

A second centrifugal flow compressor 48 is arranged upstream of the first centrifugal flow compressor 16. The second centrifugal flow compressor 48 has an inlet 46 at its upstream end and an outlet duct 50 at its downstream end. The outlet duct 50 is interconnected with the inlet duct 14 of the first radial flow compressor 16 via an aperture 52. One or more flap valves 54 are pivotally mounted by pivots 56 on the inlet duct 14 and outlet duct 50 such that in a first position the flap valves 54 are movable between a first position and a second position.

In the first position the flap valves 54 open the aperture 52 such that the second centrifugal flow compressor 48 supplies air to the first centrifugal flow compressor 16 and the flap valves 54 close the inlet 12 such that air is not supplied from the inlet 12 to the first centrifugal flow compressor 16.

In the second position the flap valves 54 open the inlet 12 such that the inlet 12 supplies air to the first centrifugal flow compressor 16 and the flap valves 54 close the aperture 52 such that air is not supplied from the second centrifugal flow compressor 48 to the first centrifugal flow compressor 16.

The second axial flow turbine 26 is arranged to drive the second centrifugal flow compressor 48 via the shaft 34 and the gearbox 36. The gearbox 36 also drives a shaft 58, which is clutched to a coaxial shaft 62. The shaft 62 is arranged to drive a second gearbox 64 and the second gearbox 64 is in turn arranged to drive a shaft 66 to which the second centrifugal flow compressor 48 is secured.

A source of water 80 is provided to supply water to the gas turbine engine 10. The water is supplied through a treatment plant 82 to produce polished water, which is stored in a polished water tank 84. The treatment plant 82 is highly purified to avoid damage to the gas turbine engine from erosion, corrosion or deposition. The treatment plant 82 removes dissolved solids, organic material and ions. The polished water 84 is supplied to the gas turbine engine 10 by a pump 86.

The pump 86 is connected, via a pipe 88 and a valve 90, to the outlet duct 50 downstream of the second centrifugal flow compressor 48, upstream of the first centrifugal flow compressor 16. The pump 86 is connected via pipes 92 and 94 and valve 96 to a position between the first centrifugal flow compressor 16 and the heat exchanger 20. The pump 86 is connected via pipes 92 and 98 and valve 100 to a position between the heat exchanger 20 and the combustor 22. The pump 86 is connected via pipes 106 and 108 and valve 110 to a position between the combustor 22 and the first radial flow turbine 24. The pump 86 is connected via pipes 106 and 112 and valve 114 to a position between the first radial flow turbine 24 and the second axial flow turbine 26. The pump 86 is connected via pipes 106 and 116 and valve 118 to a position between the second axial flow turbine 26 and the heat exchanger 20.

A condenser 120 is provided downstream of the heat exchanger 20 to remove water from the exhaust gases 28 and the condenser 120 is arranged to supply the recovered water to the water tank 80.

The water is injected into the gas turbine engine 10 at the appropriate position by any suitable water injection apparatus. Additives may be provided in the water, for example methanol, to promote atomisation and/or evaporation by lowering surface tension and to prevent freezing of the stored water. The water injection apparatus is arranged to produce water droplets as small as possible so as to avoid erosion and to maximise surface area to maximise evaporation of the water. The water droplets have a droplet size of less than 20 $\mu$m, preferably less than 10 $\mu$m and more preferably less than 5 $\mu$m.

The water injection apparatus may be pressurised such that high-pressure water is swirled in a swirl chamber before being discharged. The water injection apparatus may be pressurised such that high-pressure water is discharged at high velocity and is atomised by collision on an impaction member. The water injection apparatus may be supplied with a stream of gas such that the low-pressure water is atomised before being discharged. The water injection apparatus may be supplied with a gas, which dissolves in the water such that the gas effervesces when the pressure is reduced when the water is discharged to cause the gas containing water droplets to explode into finer water droplets. The water injection apparatus may be pressurised, to about 100 bar, and heated such that the water droplets are atomised by boiling or flash atomisation.

In operation of the gas turbine engine 10 at high power levels water is injected into the gas turbine engine 10 to boost the power obtained from a given size of engine 10. At high power levels one or more of the valves 90, 96 and 104 is opened to allow water to be injected into the gas turbine engine 10 upstream of the first centrifugal flow compressor 16, within the first centrifugal flow compressor 16, between the first centrifugal flow compressor 16 and the heat exchanger 20 and within the heat exchanger 20 respectively. The valves 90, 96 and 104 are controlled such that the water injection rate at the respective positions is controlled to maximise power boost, for example some of the valves 90, 96 and 104 may be closed.

At any given temperature of combustion in the combustor 22, the injection of water at any of the points mentioned above boosts the power of the gas turbine engine 10 due to the water mass flow. The injection of water at any of the points mentioned increases the efficiency due to a lower temperature of the air at entry to the heat exchanger 20, which increases the heat recovery from the exhaust gases 28. The injection of water upstream of the first centrifugal flow compressor 16 produces an inlet cooling effect, which reduces the compressor work and increases the flow through the first centrifugal flow compressor 16, providing a further boost in power. The injection of water into the first centrifugal flow compressor 16 produces an inter cooling effect, which reduces the compressor work and increases the flow through the first centrifugal flow compressor 16, providing a further boost in power.

The fact that the high power levels only occur intermittently means that the size and weight of the tanks 80 and 84 and water in the tanks 80 and 84 do not become prohibitive. It also minimises the possibility of erosion of the components of the gas turbine engine 10 by impacts from the water droplets.

This enables the gas turbine engine 10 to be sized smaller and still be able to meet the given duty and this provides a substantial fuel saving at low power levels and at high power levels.

In operation of the gas turbine engine 10 at low power levels water may not be injected into the gas turbine engine 10. However, it is preferred that at low power levels water is injected into the gas turbine engine 10 to reduce fuel consumption. At low power levels one or more of the valves 90, 96 and 104 is opened to allow water to be injected into the gas turbine engine 10 upstream of the first centrifugal flow compressor 16, within the first centrifugal flow compressor 16, between the first centrifugal flow compressor 16 and the heat exchanger 20 and within the heat exchanger 20 respectively. The valves 90, 96 and 104 are controlled such that the water injection rate at the respective positions is controlled to minimise fuel consumption, for example some of the valves 90, 96 and 104 may be closed.

The provision of the variable inlet guide vanes 42 for the first radial flow turbine 24 allows the injection of high flow rates of water without a reduction in the compressor surge margin that would occur with fixed inlet guide vanes. The provision of variable diffuser vanes 40 for the first centrifugal flow compressor 16 allows the injection of high flow rates of water without a reduction in the compressor surge margin that would occur with fixed inlet guide vanes.

The provision of variable inlet guide vanes 38, the variable diffuser vanes 40, the variable inlet guide vanes 42 and the variable inlet guide vanes 44 allows the flow into the first centrifugal flow compressor 16, the first radial flow turbine 24 and the second axial flow turbine 26 to be controlled to reduce, preferably minimise, erosion of the rotor components by the impacting water droplets.

During an acceleration of the gas turbine engine 10 water is injected into the gas turbine engine 10 to quickly boost the power from the gas turbine engine 10. During acceleration one or more of the valves 90, 96 and 104 is opened to allow water to be injected into the gas turbine engine 10 upstream of the first centrifugal flow compressor 16, within the first centrifugal flow compressor 16, between the first centrifugal flow compressor 16 and the heat exchanger 20 and within the heat exchanger 20 respectively. The valves 90, 96 and 104 are controlled such that the water injection rate at the respective positions is controlled to maximise power boost, for example some of the valves 90, 96 and 104 may be closed. The valves 90, 96 and 104 and the variable inlet guide vanes 38, the variable diffuser vanes 40, the variable inlet guide vanes 42 and the variable inlet guide vanes 44 are controlled to ensure an adequate surge margin for the first centrifugal flow compressor 16.

During a deceleration of the gas turbine engine 10 water is injected into the gas turbine engine 10 to quickly reduce the power from the gas turbine engine 10. During deceleration one or more of the valves 110, 114 and 118 is opened to allow water to be injected into the gas turbine engine 10 upstream of the first radial flow turbine 24, between the first radial flow turbine 24 and the second axial flow turbine 26 or between the second axial flow turbine 26 and the heat exchanger 20. The valves 110, 114 and 108 are controlled such that the water injection rate at the respective positions is controlled to maximise power reduction, for example some of the valves 110, 114 and 118 may be closed. The power reduction is achieved by reducing temperature levels in the turbines 24 and 26 and counteracts the large heat transfer from the exhaust gases 28 to the air flowing to the combustor 22 by the heat exchanger 20. This also reduces the risk of extinction of combustion in the combustor 22 from the conventional rapid reduction of fuel supply. This may also be used in the event of a shaft breakage, loss of load or emergency shut down conditions.

The amount of water injected upstream of the heat exchanger 20 air side and/or exhaust gas side may be varied transiently to minimise the thermal cycles experienced by the heat exchanger 20.

Additionally water may be sprayed onto, or flowed within, the compressor and/or turbine casings to control the clearance between the tips of the rotor blades and the casings.

The water supplied to the gas turbine engine 10 may be heated prior to injection using a heater 122. The exhaust gases 28 flow through the heater 122 positioned downstream of the heat exchanger 20. It is preferred that the water supplied from the pipes 94, 98 and 102 is heated by the heater 122 to improve the fuel consumption. It is preferred that the water supplied from the pipe 88 is unheated because heated water will offset the cooling benefit of the injected water.

The humid air supplied to the combustor 22 reduces the emissions of NOx without the requirement for an exhaust catalyst or a premixed lean burn staged combustion chamber.

In operation of the gas turbine engine 10 at high power levels the clutch 60 transmits drive from the shaft 58 to the shaft 62 such that the second centrifugal flow compressor 48 is driven by the second axial flow turbine 26. The flap valves 54 are moved to the first position such that air is supplied from the second centrifugal flow compressor 48 to the first centrifugal flow compressor 16.

In operation of the gas turbine engine 10 at low power levels the clutch 60 does not transmit drive from the shaft 58 to the shaft 62 such that the second centrifugal flow compressor 48 is not driven by the second axial flow turbine 26. The flap valves 54 are moved to the second position such that air is supplied from the inlet 12 to the first centrifugal flow compressor 16.

The levels of pressure ratio, about 4.5:1, is chosen such that increasing pressure ratio increases specific power. The power increase is due to the increase in both flow and pressure ratio.

The use of the second centrifugal flow compressor 48 in the high power level mode of operation requires a relatively long flow path, which increases the residence time for evaporation of the water for the water intercooling.

The variable guide vanes 38, 40, 42, 44 and valves 54 avoids the operational limitations inherent with a conventional fixed geometry engine. For example, the pressure ratio and hence the power of the core engine, the first compressor 16, combustor 22 and first turbine 24, may be achieved with a smaller increase in combustor 22 temperature if the second axial flow turbine 26 capacity is increased in relation to that of the first radial flow turbine 24.

The power may be increased by significantly increasing the pressure ratio as well as the combustor 22 temperature in order to avoid increasing the inlet temperature of the heat exchanger 20 such that the heat exchanger 20 is not damaged.

The flap valves 54 may be low cost non actuated flap valves 54 such that at low power levels, when the second centrifugal flow compressor 48 inactive, the first centrifugal flow compressor 16 effectively sucks air through the inlet 12 to reduce the pressure loss of sucking through the second centrifugal flow compressor 48 alone. When the second centrifugal flow compressor 48 is active the delivery pressure forces the flap valves 54 to the first position to prevent leakage of air through the inlet 12.

The flap valves 54 may be moved by powered actuators (not shown), for example hydraulic, pneumatic, electric or mechanical rams.

It may be possible to use the air drawn into the inlet 46 to drive the second centrifugal flow compressor 48, when the second axial flow turbine 26 is not driving the second centrifugal flow compressor 48, to maintain the second centrifugal flow compressor 48 at a significant rotational speed. This reduces the time lag in engine response that may occur when accelerating the second centrifugal flow compressor 48 from rest and also reduce the wear on the clutch 60 and gearboxes 36 and 64.

The arrangement also enables bleed air to be bled from the duct 14 between the second radial flow compressor 48 and the first radial flow compressor 16 or from the downstream end of the first radial flow compressor 16 of the gas turbine engine 10 at a variety of pressures and power output levels. This is particularly suitable for an aircraft auxiliary power unit gas turbine engine.

Figure 5:
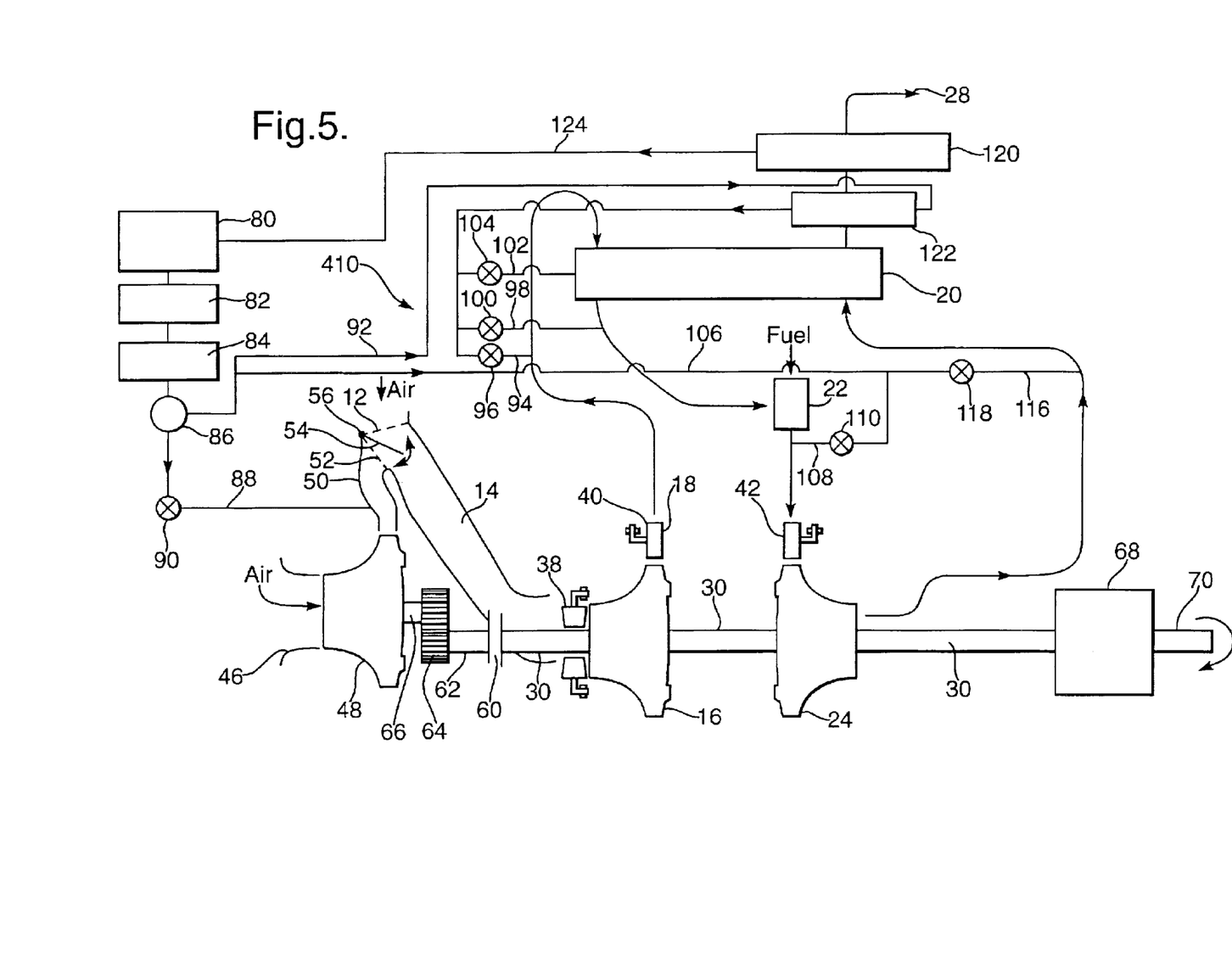
FIG. 5 is a schematic diagram of a gas turbine engine according to the present invention.

A further gas turbine engine 410 according to the present invention is shown in FIG. 5, and like parts are denoted by like numerals. FIG. 5 is similar to FIG. 4 but differs in that there is no second turbine. In this embodiment the first radial flow turbine 24 is arranged to drive an output shaft 70 via the shaft 30 and a continuously variable transmission 68. The first radial flow turbine 24 is arranged to drive the second centrifugal flow compressor 48 via the shaft 30, which is clutched to a coaxial shaft 62. The shaft 62 is arranged to drive a gearbox 64 and the gearbox 64 is in turn arranged to drive a shaft 66 to which the second centrifugal flow compressor 48 is secured. Additionally there is no pipe 112 and valve 114.

Figure 6:
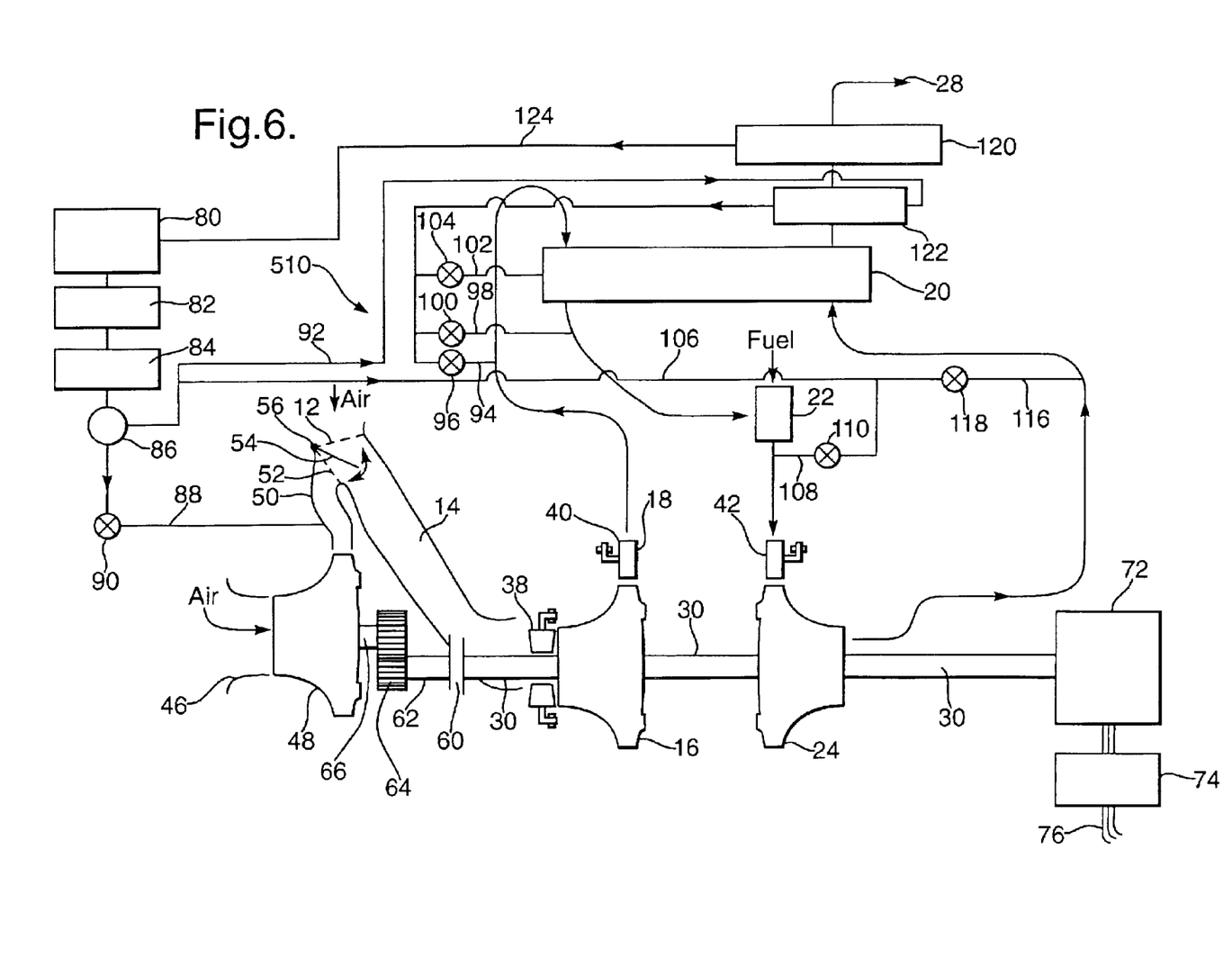
FIG. 6 is a schematic diagram of a gas turbine engine according to the present invention.

Another gas turbine engine 510 according to the present invention is shown in FIG. 6, and like parts are denoted by like numerals. FIG. 3 is similar to FIG. 1 but differs in that there is no second turbine. In this embodiment the first radial flow turbine 24 is arranged to drive an electrical generator 72, for example a high frequency alternator, via the shaft 30. The electrical generator 72 supplies electrical power via power electronics 74 to electrical power leads 76. The first radial flow turbine 24 is arranged to drive the second centrifugal flow compressor 48 via the shaft 30, which is clutched to a coaxial shaft 62. The shaft 62 is arranged to drive a gearbox 64 and the gearbox 64 is in turn arranged to drive a shaft 66 to which the second centrifugal flow compressor 48 is secured. Additionally there is no pipe 112 and valve 114.

Although the present invention has been described with reference to the injection of water into the gas turbine engine it may be possible to use other suitable liquids, which evaporate to cool the air or working fluid supplied to the combustor.

Although the invention has been described with reference to a first centrifugal flow compressor it may be equally possible to use a first axial flow compressor. Similarly although the invention has been described with reference to a second centrifugal flow compressor it may be equally possible to use a second axial flow compressor. Although the invention has been described with reference to a first radial flow turbine it may be equally possible to use a second axial flow turbine. Although the invention has been described with reference to a second axial flow turbine it may be equally possible to use a second radial flow turbine.

We claim:

1. A gas turbine engine comprising a first compressor, a combustor and a first turbine arranged in flow series, the first turbine being arranged to drive the first compressor, the first compressor having variable inlet guide vanes, the first turbine having variable inlet guide vanes, a second compressor being arranged upstream of the first compressor, an auxiliary intake being arranged upstream of the first compressor and downstream of the second compressor, valve means being arranged upstream of the first compressor and downstream of the second compressor, the valve means being movable between a first position in which the second compressor supplies fluid to the first compressor and a second position in which the second compressor does not supply fluid to the second compressor and the auxiliary intake supplies fluid to the first compressor and selective drive means being arranged to selectively drive the second compressor.

2. A gas turbine engine as claimed in claim 1 wherein a second turbine is arranged downstream of the first turbine, the second turbine having variable inlet guide vanes.

3. A gas turbine engine as claimed in claim 2 wherein the second turbine is arranged to drive an output shaft.

4. A gas turbine engine as claimed in claim 3 wherein the second turbine is arranged to drive the output shaft via a gearbox.

5. A gas turbine engine as claimed in claim 4 wherein the second turbine is arranged to drive the second compressor via the gearbox.

6. A gas turbine engine as claimed in claim 1 wherein the first turbine is arranged to drive an output shaft.

7. A gas turbine engine as claimed in claim 6 wherein the first turbine is arranged to drive the output shaft via a gearbox.

\* \* \* \* \*